(12) United States Patent
Nicholas et al.

(10) Patent No.: US 10,162,658 B2
(45) Date of Patent: *Dec. 25, 2018

(54) VIRTUAL PROCESSOR ALLOCATION TECHNIQUES

(71) Applicant: Microsoft Technology Licensing, LLC, Redmond, WA (US)

(72) Inventors: Andrew Nicholas, Bellevue, WA (US); Rene Antonio Vega, Scotts Valley, CA (US); Shuvabrata Ganguly, Seattle, WA (US); Ellsworth Davis Walker, Seattle, WA (US); Manish Chablani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,525

(22) Filed: Oct. 19, 2015

(65) Prior Publication Data
US 2016/0041838 A1 Feb. 11, 2016

Related U.S. Application Data

(63) Continuation of application No. 13/095,671, filed on Apr. 27, 2011, now Pat. No. 9,183,030.

(51) Int. Cl.
*G06F 9/46* (2006.01)
*G06F 9/455* (2018.01)

(52) U.S. Cl.
CPC .......... *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,075,938 | A | 6/2000 | Bugnion et al. |
| 6,961,941 | B1 | 11/2005 | Nelson et al. |
| 7,370,331 | B2 | 5/2008 | Brenner |
| 7,383,405 | B2 | 6/2008 | Vega et al. |
| 7,653,909 | B2 | 1/2010 | Brenner |
| 7,660,867 | B2 | 2/2010 | Sakuta |
| 8,276,009 | B2 | 9/2012 | King |

(Continued)

OTHER PUBLICATIONS

Shao et al., "Virtual Machine Resource Management for High Performance Computing Applications", 2009, IEEE International Symposium on Parallel and Distributed Processing with Applications.*

(Continued)

*Primary Examiner* — Bradley A Teets
(74) *Attorney, Agent, or Firm* — Baker & Hostetler LLP

(57) ABSTRACT

One or more virtual processors can be added or removed from a virtual machine based on CPU pressure measured within the virtual machine. In addition to the foregoing, CPU pressure can also be used to determine whether to remove a virtual processor from a virtual machine, which may cause the computer system to consume less power. In the alternative, virtual processors can be parked and/or unparked in order to reduce the amount of power consumed by the virtual machine. In addition, virtual processors can be forcibly parked during a migration operation.

17 Claims, 11 Drawing Sheets

(56) References Cited

U.S. PATENT DOCUMENTS

| | | | |
|---|---|---|---|
| 8,286,161 | B2 | 10/2012 | Togawa et al. |
| 8,336,054 | B2 | 12/2012 | Cherkasova et al. |
| 9,183,030 | B2* | 11/2015 | Nicholas ............... G06F 9/45558 |
| 2005/0262504 | A1 | 11/2005 | Esfahany et al. |
| 2006/0230400 | A1 | 10/2006 | Armstrong et al. |
| 2008/0028411 | A1 | 1/2008 | Cherkasova et al. |
| 2008/0034365 | A1 | 2/2008 | Dahlstedt |
| 2008/0082977 | A1 | 4/2008 | Araujo et al. |
| 2008/0184227 | A1 | 7/2008 | Matsumoto et al. |
| 2009/0113422 | A1 | 4/2009 | Kani |
| 2009/0204959 | A1* | 8/2009 | Anand ................... G06F 9/5027 718/1 |
| 2009/0260008 | A1 | 10/2009 | Cho et al. |
| 2009/0288083 | A1 | 11/2009 | Ciano et al. |
| 2009/0300317 | A1* | 12/2009 | Hepkin ................ G06F 9/4812 711/173 |
| 2009/0307439 | A1 | 12/2009 | Jacobs et al. |
| 2009/0307440 | A1 | 12/2009 | Jacobs et al. |
| 2010/0250868 | A1 | 9/2010 | Oshins |
| 2010/0251234 | A1* | 9/2010 | Oshins ................. G06F 9/4856 718/1 |
| 2011/0010713 | A1 | 1/2011 | Matsumoto et al. |
| 2011/0083134 | A1* | 4/2011 | Song ..................... G06F 9/5077 718/104 |
| 2011/0126203 | A1* | 5/2011 | Fahrig .................. G06F 9/5077 718/102 |
| 2011/0145505 | A1* | 6/2011 | Anand ................ G06F 12/0895 711/130 |
| 2011/0246171 | A1 | 10/2011 | Cleeton et al. |
| 2011/0296407 | A1 | 12/2011 | Bhandari et al. |
| 2012/0084774 | A1 | 4/2012 | Post et al. |
| 2012/0272235 | A1 | 10/2012 | Fahrig |

OTHER PUBLICATIONS

Mlynski, "The analysis of IBM pSeries servers' virtualization mechanism on dynamic resources allocation in AIX 5L", 2008.*

"Configuring CPU resources for Virtual Machines"; http:—technet.microsoft.com-en-us-library-cc720296(WS.10).aspx; accessed Nov. 24, 2010; 1-2.

"Virtual PC vs. Virtual Server: Comparing Features and Uses"; http:—technet.microsoft.com-en-us-library-cc708309(WS.10).aspx; accessed Nov. 24, 2010; 1-5.

* cited by examiner

VIRTUAL PROCESSOR ALLOCATION TECHNIQUES

BACKGROUND

A virtual machine is a software implementation of a physical machine. Instead of directly interacting with physical hardware of a physical computer system, a layer of virtualizing software (typically called a hypervisor or virtual machine monitor) is installed on a computer system and this software controls how virtual machines interact with the physical hardware by time-slicing the physical hardware and emulating the presence of physical hardware within the virtual machines.

One hardware resource that a hypervisor time-slices is a physical processor. Generally, a physical processor is exposed within a virtual machine as a virtual processor. A guest operating system can run a workload on the virtual processor by scheduling a thread on the virtual processor and a hypervisor scheduler can execute and schedule a thread that represents the virtual processor on a physical processor. Next, the thread indicative of the workload runs and some, hopefully useful, work is performed. The hypervisor scheduler may then run another thread on the same, or a different physical processor. Thus, the hypervisor scheduler determines both when and where to schedule a particular virtual processor.

For the most part, the amount of power consumed by the physical machine is dependent on the number of physical processors within the physical machine. Since processors consume large amounts of power and every processor in a computer system may not be needed to execute a given workload, physical processors can be placed in an idle state and/or processor speed can be reduced. When a processor is inactive or "parked" it does not use much power. Consequently, the overall amount of power consumed by the computer system is reduced.

SUMMARY

In an exemplary embodiment, one or more virtual processors can be added to a virtual machine based on CPU pressure measured within the virtual machine. In addition, CPU pressure can also be used to determine whether to remove a virtual processor from a virtual machine, which may cause the computer system to consume less power. In the same, or another embodiment, virtual processors can be parked and/or unparked in order to reduce the amount of power consumed by the virtual machine. In addition, virtual processors can be forcibly parked during a migration operation. In addition to the foregoing, other techniques are described in the detailed description, claims, and drawings.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Figure 1:
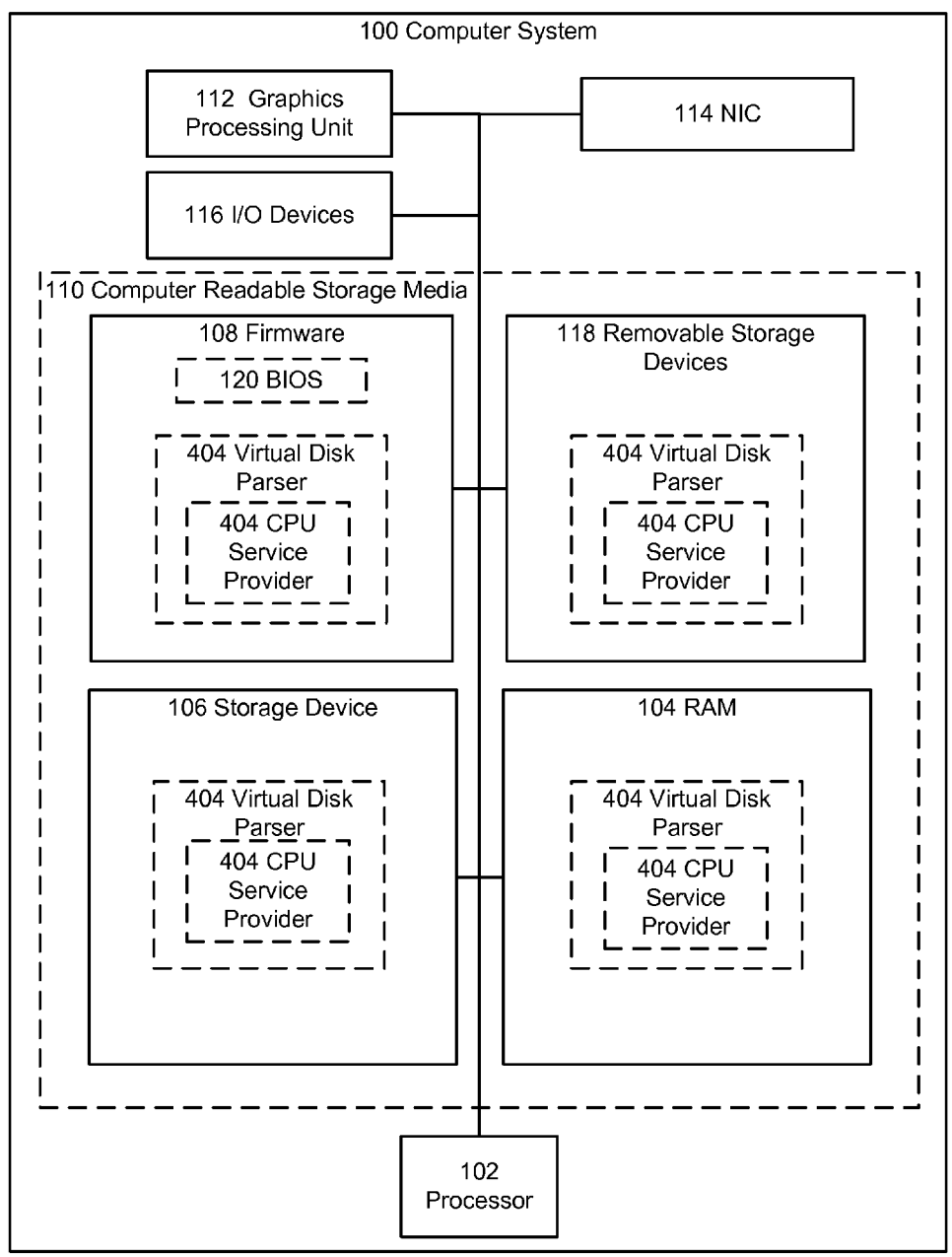
FIG. 1 depicts a high-level block diagram of a computer system.

The disclosed subject matter may use one or more computer systems. FIG. 1 and the following discussion are intended to provide a brief general description of a suitable computing environment for effectuating techniques described in this document.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by the figure, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer-readable storage media 110 can provide non volatile and volatile storage of processor executable instructions 122, data structures, program modules and other data for the computer system 100 such as executable instructions. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs. In exemplary embodiments, computer-readable storage media 110 can store CPU service provider 404, which is described in more detail in the following paragraphs, can be executed by processor 102 thereby transforming computer system 100 into a computer system configured for a specific purpose, i.e., a computer system configured according to techniques described in this document.

Commands and information may be received by computer system 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
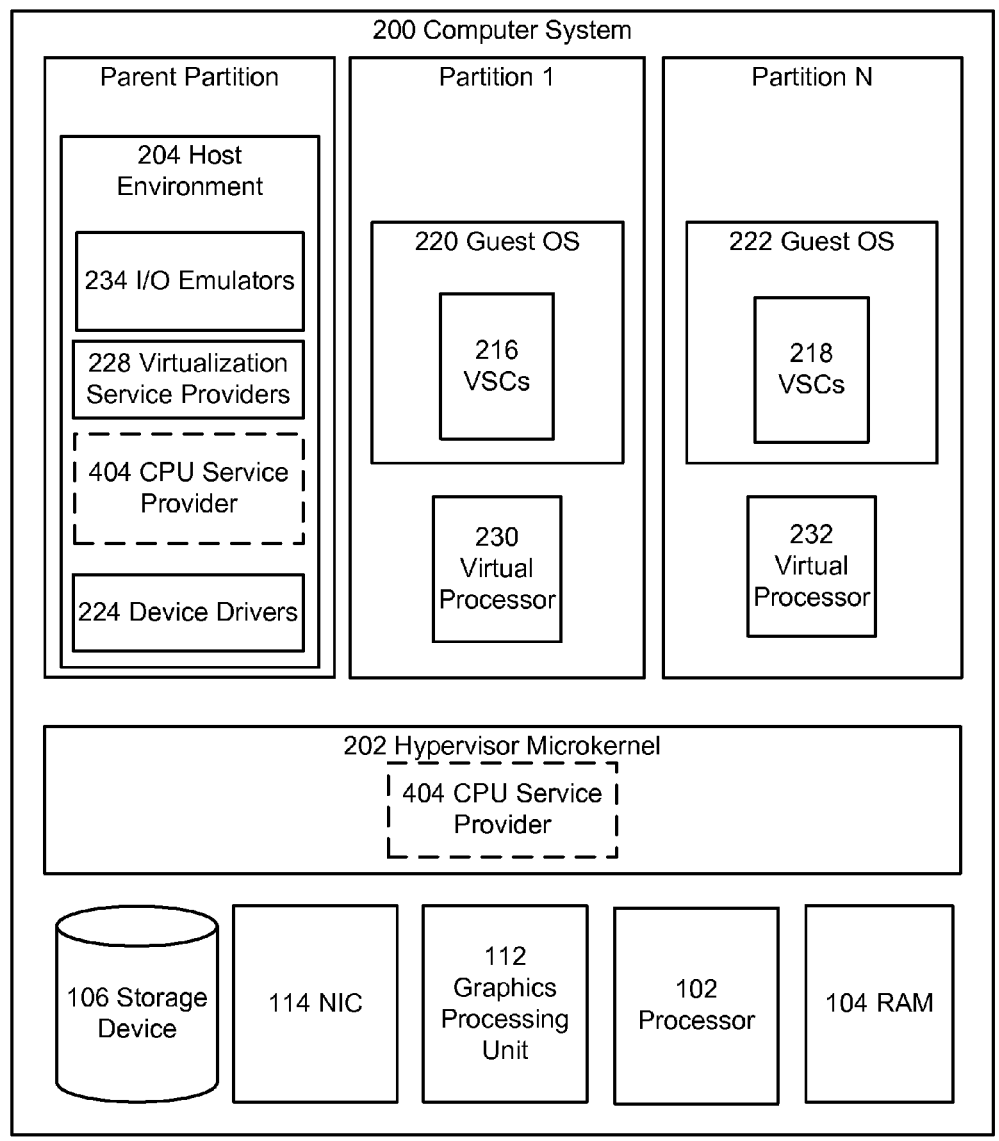
FIG. 2 depicts a high-level block diagram of an exemplary architecture for a virtualizing software program.

Turning to FIG. 2, illustrated is an exemplary virtualization platform that can be used to generate virtual machines. In this embodiment, microkernel hypervisor 202 can be configured to control and arbitrate access to the hardware of computer system 200. Microkernel hypervisor 202 can generate execution environments called partitions such as child partition 1 through child partition N (where N is an integer greater than 1). Here, a child partition is the basic unit of isolation supported by microkernel hypervisor 202. Microkernel hypervisor 202 can isolate processes in one partition from accessing another partition's resources. In particular, microkernel hypervisor 202 can isolate kernel mode code of a guest operating system from accessing another partition's resources as well as user mode processes. Each child partition can be mapped to a set of hardware resources, e.g., memory, devices, processor cycles, etc., that is under control of the microkernel hypervisor 202. In embodiments, microkernel hypervisor 202 can be a standalone software product, a part of an operating system, embedded within firmware of the motherboard, specialized integrated circuits, or a combination thereof.

Microkernel hypervisor 202 can enforce partitioning by restricting a guest operating system's view of the memory in a physical computer system. When microkernel hypervisor 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by microkernel hypervisor 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a logically contiguous working memory. In a virtualized environment, a guest operating system can use one or more page tables, called guest page tables in this context, to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host environment 204. Host environment 204 can be an operating system (or a set of configuration utilities) and host environment 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in they communicate with host environment 204 via VSPs instead of communicating with hardware or emulated hardware. In an exemplary embodiment the path used by virtualization service providers 228 to communicate with virtualization service clients 216 and 218 can be thought of as the enlightened IO path.

As shown by the figure, emulators 234, e.g., virtualized IDE devices, virtualized video adaptors, virtualized NICs, etc., can be configured to run within host environment 204 and are attached to emulated hardware resources, e.g., IO ports, guest physical address ranges, virtual VRAM, emulated ROM ranges, etc. available to guest operating systems 220 and 222. For example, when a guest OS touches a guest virtual address mapped to a guest physical address where a register of a device would be for a memory mapped device, microkernel hypervisor 202 can intercept the request and pass the values the guest attempted to write to an associated emulator. Here, the emulated hardware resources in this example can be thought of as where a virtual device is located in guest physical address space. The use of emulators in this way can be considered the emulation path. The emulation path is inefficient compared to the enlightened IO path because it requires more CPU time to emulate devices than it does to pass messages between VSPs and VSCs. For example, several actions on memory mapped to registers are required in order to write a buffer to disk via the emulation path, while this may be reduced to a single message passed from a VSC to a VSP in the enlightened IO path, in that the drivers in the VM are designed to access IO services provided by the virtualization system rather than designed to access hardware.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be directly executed by physical processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
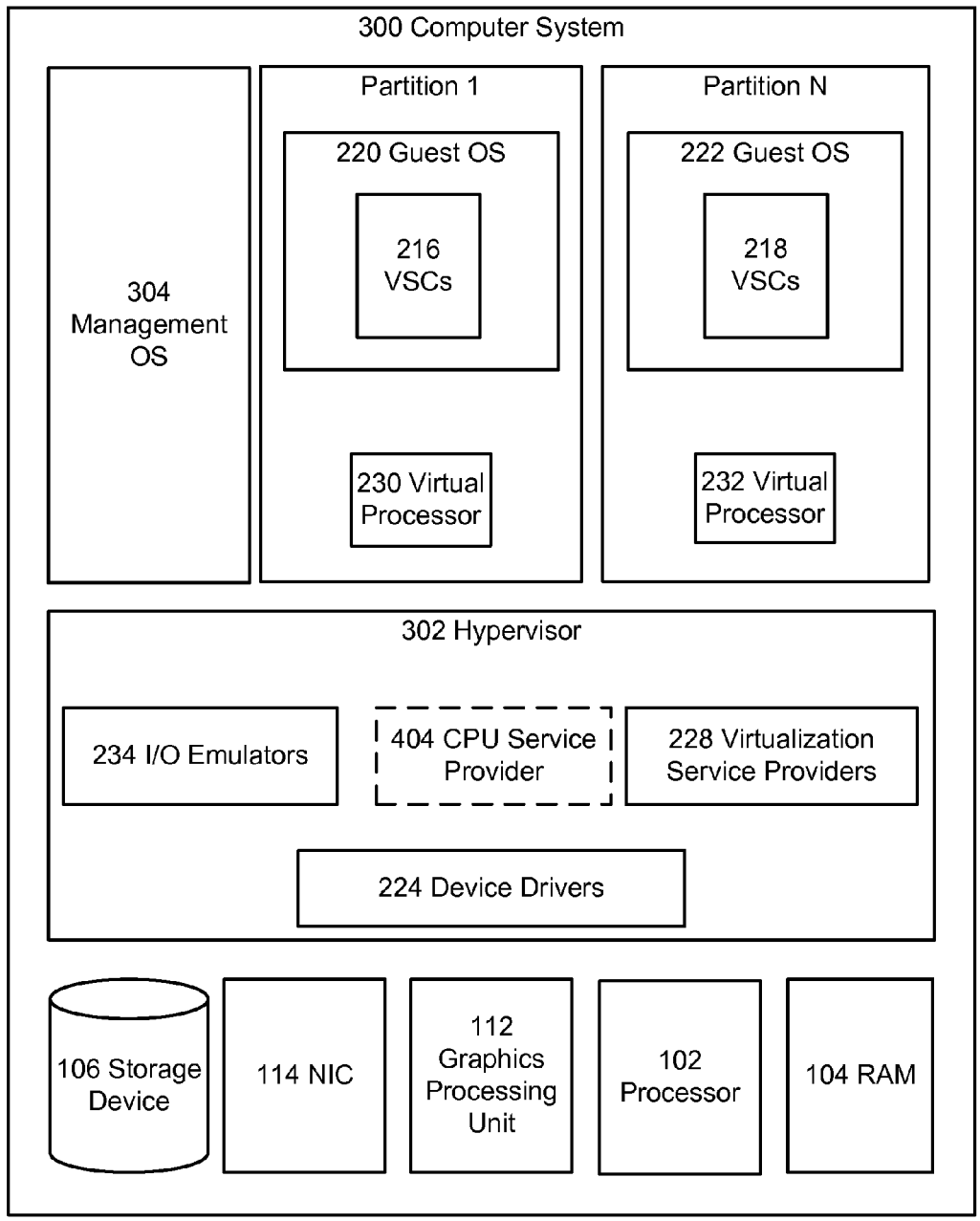
FIG. 3 depicts a high-level block diagram of an alternative architecture for a virtualizing software program.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host environment 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as microkernel hypervisor 202 of FIG. 2; however, in this architecture hypervisor 304 effectuates the enlightened IO path and includes the drivers for the physical hardware of the computer system. Hypervisor 302 of FIG. 3 can be a stand alone software product, a part of an operating system, embedded within firmware of the motherboard or a portion of hypervisor 302 can be effectuated by specialized integrated circuits.

Figure 4:
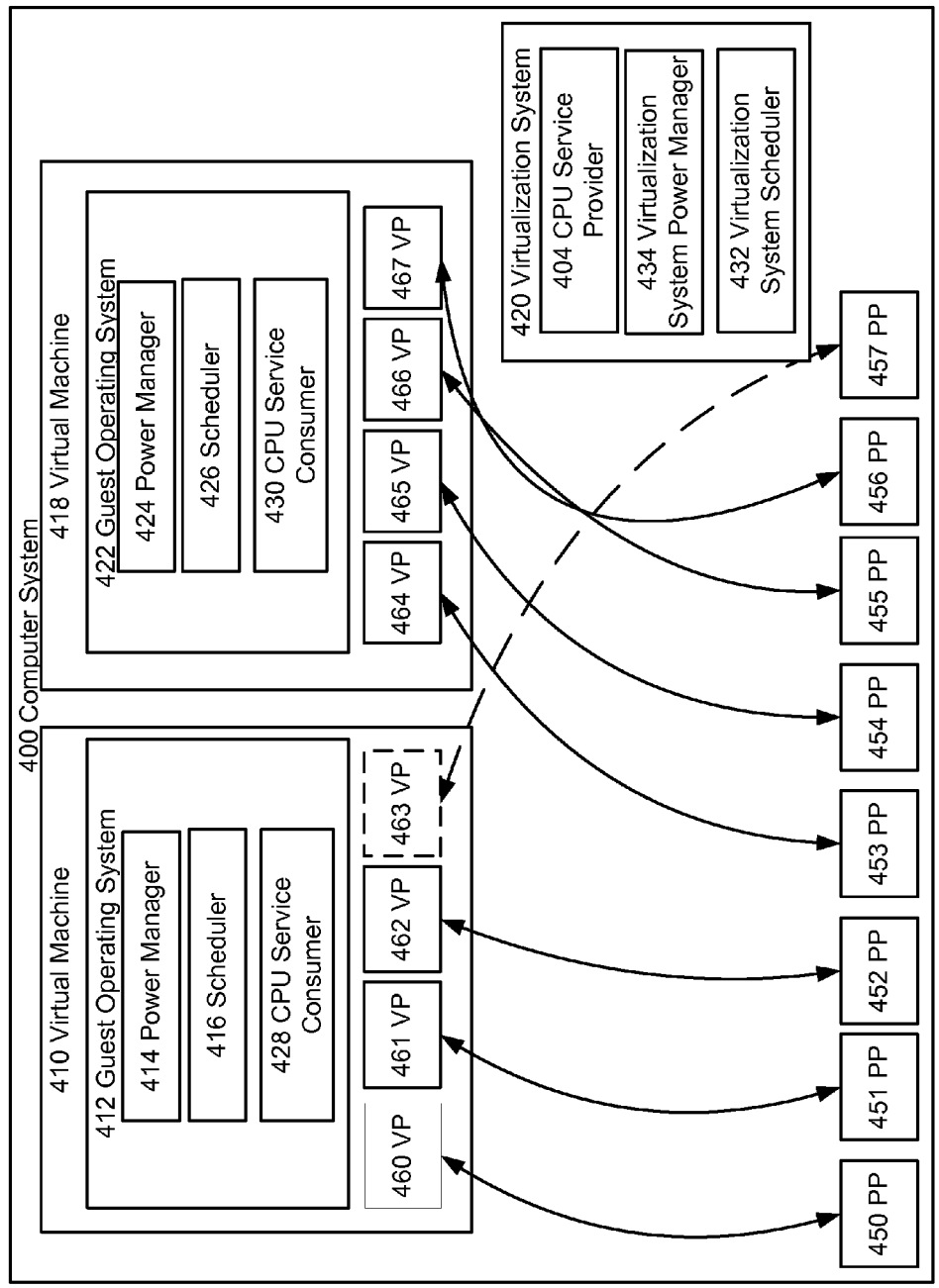
FIG. 4 depicts a high-level block diagram of a computer system including a symmetric multiprocessing topology.

Turning now to FIG. 4, it describes computer system 400 including central processing unit service provider 404 ("CPU service provider"). CPU service provider 404, which is described in detail in subsequent paragraphs, can be configured to add or remove virtual processors from virtual machines. By adding virtual processors CPU service provider 404 can attempt to reduce high CPU pressure within virtual machines and by removing virtual processors CPU service provider 404 can attempt to reduce the amount of power consumed by computer system 400. CPU service provider 404 can work with a CPU service consumer such as CPU service consumer 428 or 430 to park or unpark virtual processors.

The following paragraphs provide a general overview of the components illustrated by FIG. 4 and a more detailed description of CPU service provider 404 follows the general overview. Turning briefly to virtualization system 420, in an exemplary embodiment computer system 400 can include components similar to those described above with respect to FIG. 1 through 3. In this figure, however, the particularities of the virtualization platforms described above have been abstracted out and have been represented by virtualization system 420. As such, virtualization system 420 can be thought of as a high-level representation of the virtualization platform illustrated by FIG. 2 or FIG. 3. Thus, use of the term "virtualization system 420" throughout this document signals that the virtual processor allocation techniques described in the following paragraphs can be implemented within any type of virtualization software layer or in any type of virtualization platform. In a specific example, CPU service provider 404 could be executed within host environment 204 of FIG. 2. Alternatively, CPU service provider 404 could be executed within hypervisor 302 of FIG. 3.

Briefly, FIG. 4 shows two guest operating systems 412 and 422 running within virtual machine 410 and virtual machine 418 (while two virtual machines are illustrated, virtualization system 420 can effectuate N number of virtual machines, where N is an integer greater than 1). A guest operating system can act as a platform for executing various programs such as word processors, videogames, e-mail clients, etc. Each guest operating system can include multiple components such as a power manager (414 and 424) as well as a scheduler (416 and 426), and a CPU service consumer (428 and 430).

Schedulers 416 and 426 are tasked with scheduling threads on virtual processors. As such, schedulers 416 and 426 can use various data to determine when and where to schedule a thread. One such data structure that can be used is called an idle virtual processor map (not-illustrated). An idle virtual processor map can include a bit or byte for each virtual processor ("VPs") (460-467) the scheduler can schedule threads on. When a virtual processor runs, it can set a bit or byte in the map. This bit or byte signals to the scheduler that it is running a thread as opposed to being idle. When scheduler 416 or 426 runs a thread, it can be configured to check the idle virtual processor map to determine what virtual processors are idle and select one.

When a request to run a virtual processor is received, virtualization system scheduler 432 can access a data structure and retrieve information about the virtual processor to determine what physical processor ("PPs") (450-457) to run it on. The data structure can store a timestamp identifying when the virtual processor last ran and the identity of the ideal physical processor for the virtual processor. Virtualization system scheduler 432 can select a physical processor to run the virtual processor and set a bit in an idle physical processor map that indicates that the physical processor is running a thread as opposed to being idle. Similar to the idle virtual processor map, the idle physical processor map can be used by virtualization system scheduler 432 to determine what physical processors can be selected to run a virtual processor.

Virtualization system scheduler 432 can be configured to favor running a virtual processor on its ideal physical processor. Referring to the curved arrows of FIG. 4, these arrows represent that each virtual processor can have an ideal physical processor. Consequently, when a request to run a virtual processor is received, virtualization system scheduler 432 can attempt to first run the virtual processor on its ideal physical processor before selecting a different virtual processor. As such, virtual processors are not always run on their ideal physical processor. One reason to use ideal physical processors is to minimize the chance that a cache miss occurs. Briefly, a cache miss occurs when a processor attempts to access information from a cache and the information is not in cache, which is called a miss. The cost of the miss is the amount of cycles wasted due to having to go out to a different memory to obtain the information. By running a virtual processor on its ideal physical processor, the chance that a cache miss will occur is significantly reduced.

Ideal physical processors can be set during a virtual processor initialization process. For example, when a virtual machine is started, virtualization system 420 can determine a number of virtual processors to allocate to the virtual machine (this information can be obtained from a configuration file) and instantiate the virtual processors within the virtual machine. In addition, virtualization system 420 can determine an ideal physical processor for a virtual processor and store information that links the virtual processor to its ideal physical processors in the aforementioned data structure. Virtualization system 420 can assign ideal physical processors to virtual processors based on virtual machine priority, the number of available resources, a guaranteed level of service, etc. In addition, virtualization system 420 can attempt to link virtual processors within a virtual machine such that the physical processors share one or more levels of cache. In addition, virtualization system 420 can be configured to avoid linking virtual processors within the same virtual machine to the same physical processor. This is to increase the chance that concurrent execution can be achieved within the virtual machine.

Continuing with the general overview of FIG. 4, power manager 414, 422, and virtualization system power manager 434 are illustrated. Briefly, power managers 414 and 424 can be configured to manage and apply a power policy to virtual machines 410 and 418. The power manager can receive the power policy and attempt to implement it by managing virtual processor states, e.g., by directing processors to transition into low power states as well as by changing the operating frequency of processors. Likewise, virtualization system power manager 434 can receive a power policy for computer system 400 and attempt to implement it by managing physical processor states.

In addition to transitioning processors into low-power states, a power manager can generate information that indicates what processors are inactive, i.e., parked, and provide the information to its corresponding scheduler. Referring to schedulers 416 and 426, these schedulers can give preference to unparked, i.e., active, virtual processors rather than parked virtual processors when it schedules any non-affinitized threads. This lets the parked virtual processors enter a deeper C-state. When the virtual processors idle, the corresponding physical processors may also idle and virtualization system power manager 434 can transition the physical processors to a deeper C-state.

Referring back to CPU service provider 404, in an exemplary embodiment, it can be configured to adjust, e.g., add/remove, the number of virtual processors allocated to virtual machines by working with CPU service consumers 428 and 430. Briefly, CPU service consumer 428 and 430 can be effectuated by executable instructions that run within the corresponding guest operating system 412 or 422. These CPU service consumers 428 and 430 can communicate with CPU service provider 404 via an inter-partition communication channel, i.e., a region of memory shared between virtualization system 420 and a virtual machine that can be used to pass messages between virtualization system 420 and the virtual machine.

When adding a virtual processor, e.g., virtual processor 463, to virtual machine 410, virtualization system 420 can instantiate virtual processor 463 as an uninitialized virtual processor and a system control interrupt can be sent by CPU service provider 404 to CPU service consumer 428 running within virtual machine 410 indicating that it has added a new virtual processor. CPU service consumer 428 can start an initialization process by causing virtual processor 457 to execute bootstrapping code. Once virtual processor 463 completes running the bootstrap code it can enter the idle loop of scheduler 416.

In an exemplary embodiment, the decision to add or remove a virtual processor can be based at least in part on processor utilization data. At a high level, processor utilization data indicates "how much" of a processor's cycles within a predetermined time period, e.g., 10 milliseconds, 1 second, 30 seconds, etc., are spend running threads. Processor utilization data can be viewed from either the perspective of the virtual machine or the computer system. For example, performance counters within a virtual machine can measure processor utilization data from the perspective of the virtual machine (herein referred to as virtual processor utilization data) whereas performance counters running within virtualization system 420 can measure processor utilization data from the perspective of computer system 400 (herein referred to as physical processor utilization data).

Processor utilization data can be determined from the aforementioned idle virtual processor maps and idle physical processor maps. For example, a scheduler running within a virtual machine (such as scheduler 416) and/or virtualization system scheduler 432 can track the number of cycles a processor spend doing "work" within a time period, e.g., 1 second, 30 seconds, etc., and use this information to determine processor utilization data. As such, processor utilization can be thought of as the percentage of time that a processor spends doing work rather than being idle. For example, if a processor is fixed at a frequency of 2.0 GHz and runs threads for 1 billion cycles in one second it is 50% utilized for that second. Virtualization system scheduler 432 can store processor utilization data for a processor along with an identifier indicating the virtual processor that it was running in a data structure stored in random access memory.

Since virtualization system 420 is time-slicing physical processors, in some instances the virtual processor utilization data will indicate that a virtual processor ran threads for a greater number of cycles than it actually did. For example, the virtual processor utilization data for virtual processor 460 may be 80%; however, since the physical processor was time-sliced, the physical processor utilization data attributable to virtual processor 460 may be only 30%. This discrepancy occurs because the bits or bytes in the idle virtual processor map are cleared when the virtual processor is run again within the virtual machine. For example, suppose that when virtual processor 460 is scheduled to run a thread it sets a bit is set in the idle virtual processor and virtualization system scheduler 432 runs the thread on physical processor 450. After a predetermined time period elapses, virtualization system scheduler 432 runs virtual processor 646 before it runs virtual processor 460 again. The bit or byte in the idle processor map is not cleared until virtualization system 432 runs virtual processor 460 again. Thus, from the perspective of scheduler 416, virtual processor 460 was running the entire time until the bit was cleared, even though virtual processor 464 ran for part of the time.

In a specific example, suppose that virtual processor 460 and 464 have been running on the same physical processor, e.g., physical processor 450. In this example, suppose that 30% of the available cycles for physical processor 450 over a second of time were used to run virtual processor 460 and 40% were used to run virtual processor 464. In this example, the physical processor utilization data for physical processor 450 would be measured at 70%; however, since virtual processor 460 does not clear the bit in idle virtual processor map until virtualization system scheduler 432 runs virtual processor 460 again, guest operating system 412 measures virtual processor 460 as 70% utilized.

Since virtual processor utilization data may not accurately reflect the number of processor cycles used within a given time period, in an exemplary embodiment, physical processor utilization data can be used to determine whether or not to add a virtual processor to a virtual machine. In this example, CPU service provider 404 can track physical processor utilization data for physical processors within computer system 400, e.g., utilization data for physical processors 450-457, and determine what proportion of the physical processor utilization data can be attributed to running the different virtual processors of each virtual machine, e.g., virtual machine 410 and virtual machine 418. For example, suppose that during a second of time physical processor 450 runs virtual processor 460 for 30% of the cycles, virtual processor 461 for 10% of the available cycles, virtual processor 464 for 60% of the available cycles. In this example, CPU service provider 404 can determine that 40% of the cycles can be attributed to running virtual processors of virtual machine 410 from the information stored in the aforementioned data structure. CPU service provider 404 could also determine that 30% of the cycles were spend running virtual processor 460 and 10% were spend running virtual processor 461. Likewise, CPU service provider 404 can determine the same type of information for each physical processor within computer system 400 for the time period.

In an exemplary configuration, CPU service provider 404 can then combine the physical processor utilization data attributable to running virtual processors of a virtual machine and obtain the average physical processor utilization data attributable to running virtual processors of a virtual machine and compare it to a threshold, e.g., 60%, 70%, 80%, etc. In the instance that the average is greater than the threshold, CPU service provider 404 can add another virtual processor to virtual machine 410.

In another embodiment, virtual processor utilization data can be used in conjunction with physical processor utilization data to determine whether or not to add a virtual processor to a virtual machine. In this example, CPU service provider 404 can send physical processor utilization data that is attributable to running virtual processors within virtual machine 410 to CPU service consumer 428 at predetermined intervals, e.g., every 1 second, every 30 seconds, etc. In this example, CPU service consumer 428 can also receive virtual processor utilization data from scheduler 416 and determine whether the virtual processor utilization data is over a threshold, e.g., 90%. If it is, CPU service consumer 428 can determine what proportion of the physical processor utilization data can be attributed to running virtual processors of virtual machine 410. In the instance that the physical processor utilization data attributable to running virtual processors within virtual machine 410 is higher than the threshold, CPU service provider 404 can add a virtual processor, such as virtual processor 463 to virtual machine 410. Alternatively, CPU service consumer 428 can send virtual processor utilization data to CPU service provider 404, which can be configured to determine whether the virtual processor utilization data is over a threshold and if it is add a virtual processor to virtual machine 410.

In another example, CPU service provider 404 can account for affinity bound threads when determining whether or not to add or remove a virtual processor. For example, some operating systems allow an application to set thread affinity, which forces the scheduler to run the thread on a specific subset of processors. Processor affinity takes advantage of cache hits, i.e., the ability to reuse data or information from cache. As such, scheduling a thread to run on the same processor each time could result in the thread running more efficiently than if it was to run on another processor. Since affinity bound threads are run on the same processor, the addition of another virtual processor may not relieve CPU pressure that can be attributed to these threads. As such, in an embodiment, physical processor utilization data attributable to affinity bound threads can be removed from consideration.

In an exemplary configuration, utilization data for affinity bound threads can be removed from consideration by a CPU service consumer or CPU service provider 404. For example, physical processor utilization data obtained from virtualization system scheduler 432 can be used along with virtual processor utilization data obtained from a scheduler running within a guest operating system to remove utilization data for affinity bound threads from consideration. In a specific example, and referring to virtual machine 410, CPU service consumer 428 can receive physical processor utilization data for a time period from CPU service provider 404 and virtual processor utilization data for the same time period from scheduler 416. CPU service consumer 428 can then determine the physical processor utilization data for each guest operating system thread that was run within the time period. CPU service consumer 428 can compare identifiers for each guest operating system thread to a list of affinitized threads and remove the associated utilization data. CPU service consumer 428 can then add the utilization data for the remaining threads to determine the proportion of physical processor utilization data that is attributable to non-affinitized threads. Once this value is determined, it can be compared to a threshold. In the instance that the utilization data exceeds the threshold, CPU service consumer 428 can send a message to CPU service provider 404 that includes a request for an additional virtual processor or additional virtual processors. In an alternative embodiment, CPU service provider 404 can execute the aforementioned operations to determine the proportion of physical processor utilization data that is attributable to non-affinitized threads and compare the data to the threshold by receiving guest operating system thread information from CPU service consumer 428.

Once a request to add a virtual processor is received by CPU service provider 404 (or CPU service provider 404 determines to add a virtual processor), a determination can be made as to whether computer system 400 can accommodate another virtual processor. In an exemplary embodiment, this determination can be made by at least estimating utilization data for the new virtual processor and determining whether a physical processor within computer system 400 includes enough excess cycles to accommodate the virtual processor. For example, and referring to virtual machine 410, virtualization system scheduler 432 can use the physical processor utilization data that can be attributed to running virtual processors 460-462 to estimate how much of a physical processor will be needed to run virtual processor 463.

In an exemplary embodiment, the estimated utilization data for virtual processor 463 (or any other virtual processor) can be the average of the physical processor utilization data used to run virtual processors 460-462. Suppose that virtualization system scheduler 432 determines that virtual processor 460 was run 80% of a time period, virtual processor 461 was run 90% of the time period, and virtual processor 462 was run 70% of the time period (virtual processors 460-462 may have been run on ideal physical processors, on any physical processors, or on ideal physical processors for part of the time period and other physical processors for the remainder of the time period). In this example, CPU service provider 404 can estimate that virtual processor 463 will consume 80% of the available cycles of a physical processor. In another embodiment, the average can be multiplied by a scalar and the scaled average can be used as the estimated utilization data for virtual processor 463. For example, suppose the scalar is 1.1. In this example, CPU service provider 404 can estimate that virtual processor 463 will consume 88% of the available cycles of a physical processor. In yet another embodiment, CPU service provider 404 can estimate how many cycles of a physical processor virtual processor 463 will consume based on physical processor utilization data for the virtual processor experiencing the heaviest load.

Once the estimated utilization data for the new virtual processor is generated, CPU service provider 404 can determine at least whether a physical processor within computer system 400 has enough excess capacity to handle the virtual processor. In the instance that a physical processor that has enough excess capacity is identified, CPU service provider 404 can add virtual processor 463 and set the identified physical processor as the ideal physical processor. Turning to FIG. 4, suppose that physical processor 457 has excess capacity and was chosen as the ideal virtual processor for virtual processor 463.

In the same, or another embodiment, CPU service provider 404 can use excess capacity information as well as non-uniform memory access node ("NUMA") topology information when selecting a physical processor. For example, a computer system can include a symmetric multiprocessing topology ("SMP"), i.e., a 'flat' topology, or a NUMA topology. Generally, SMP is a computer architecture that includes a plurality of processors that are connected to a single shared memory. In this arraignment, a single memory controller can manage the flow of data to and from memory. Memory access may be uniform with respect to each physical processor and each physical processor can access the entire range of memory, i.e., system physical addresses. This topology works well for computer systems (such as computer system 400 of FIG. 4) with a relatively small number of physical processors, but when the computer system includes many physical processors, all competing for access to the shared memory bus, performance of the system can decrease. Moreover, the complexity of effectuating a computer system that can handle access requests to the same resources from many physical processors significantly increases the price per processor.

Figure 5:
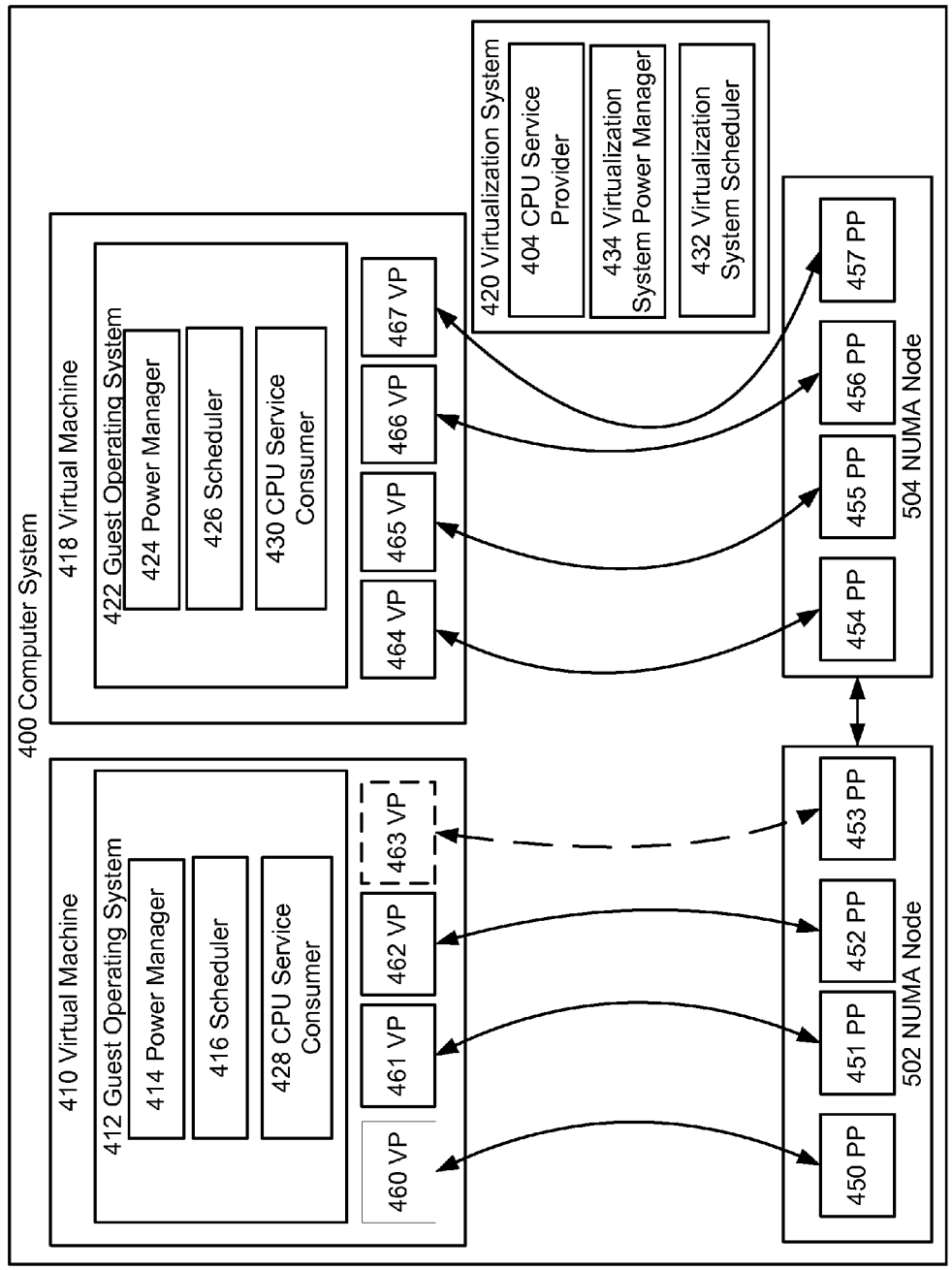
FIG. 5 depicts a high-level block diagram of a computer system including a NUMA topology.

Alternatively, as shown by FIG. 5, computer system 400 can be a NUMA node based computer system. NUMA computer systems can be generally though of as computers that are made up of smaller computer systems. In this example, each NUMA node can include one or more physical processors and local memory. The memory inside of a NUMA node (e.g., NUMA node 502) is considered local memory because processors inside of the node are connected to the same memory bus whereas memory in other NUMA nodes (e.g., NUMA node 504) is considered remote memory because it is connected to a different memory bus. NUMA nodes 502 and 504 can be interconnected by a cache coherency domain interconnect, which allows processors in one NUMA node to access memory in other NUMA nodes in a coherent way, i.e., system physical addresses are uniform with respect to each processor. Or put another way, system physical address 20,000 is the same for every processor in the computer system. The difference is that for some processors memory address 20,000 is a local memory address and for other processors memory address 20,000 is remote. Generally, local memory can be accessed faster than remote memory and the relationship between local and remote access time is called a NUMA ratio. A NUMA ratio of 1 to 2 means that it costs twice as many processor cycles to access a particular remote system physical address than a local system physical address. NUMA alleviates bottlenecks caused by SMP systems by limiting the number of processors on any one memory bus and is generally less expensive than a SMP computer system with the same amount of physical processors.

CPU service provider 404 can take NUMA topology into account when selecting a physical processor to be the ideal physical processor for a virtual processor by de-emphasizing physical processors in remote NUMA nodes when making a determination. For example, when selecting a physical processor, CPU service provider 404 can generate a list of physical processors that have excess capacity and a list of physical processors that are set as ideal physical processors for virtual processors within virtual machine 410. CPU service provider 404 can determine that NUMA node 502 is the target NUMA node by determining that it includes ideal physical processors for virtual machine 410 and that physical processor 453 has excess capacity. CPU service provider 404 can then set physical processor 453 to be the ideal physical processor for virtual processor 463, e.g., CPU service provider 404 can store information in a data structure used by virtualization system scheduler 432.

Figure 6:
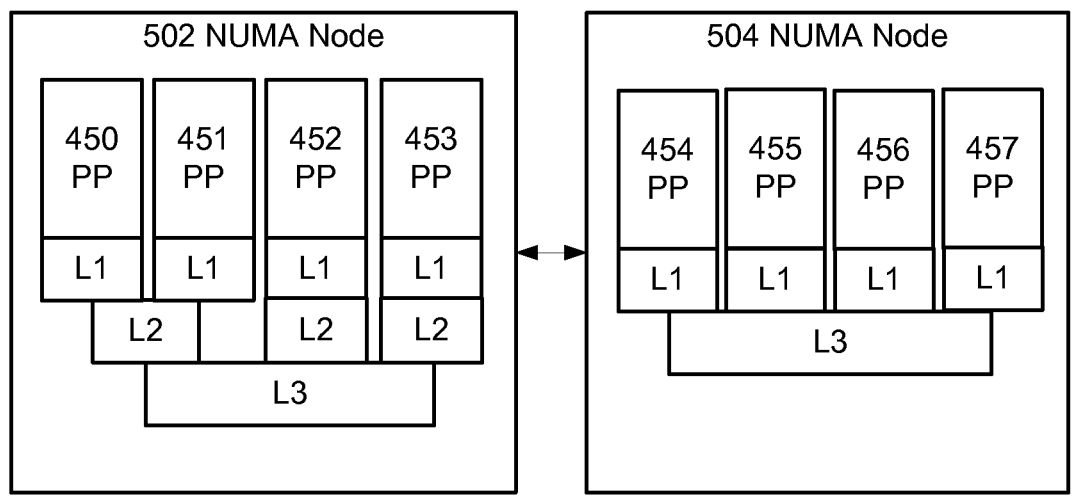
FIG. 6 depicts a high-level block diagram of cache topology.

In addition to NUMA topology information, in an exemplary embodiment and turning to FIG. 6, cache topology information can be used to select a physical processor to set as the ideal physical processor for a virtual processor. Briefly, and as shown by the figure, each physical processor (450-455) can share one or more levels of cache (while FIG. 6 shows a specific layout of caches, other configurations may exist and embodiments described in the document are not limited to using the illustrated cache topology). Physical processors may share a level 3 ("L3") cache or a level 2 ("L2") cache. Each processor also may include its own level 1 ("L1") cache, which is typically not shared. Processor cache is typically used for temporary storage of instructions and data herein referred to as information. A physical processor uses instructions for executing a request and data to execute the instruction with. Since the processor operates at speeds greater than RAM, high speed caches have been added to processors and algorithms have been devised to anticipate what information a logical processor will need and attempt to store it in caches. Typically, level 1 cache is very small, which allows it to be very fast having latency times of, for example, two cycles, i.e., the number of processor cycles needed to access the memory and retrieve the information. If the information is not present in L1 cache, a cache miss occurs and the logical processor checks its L2 cache, which is a slightly larger pool of memory with a little longer latency of around, for example, nine cycles. If the data is not in L2 or L1, the logical processor checks its L3 cache. L3 cache is far larger than L1 and L2 and its latency is, for example, twenty three cycles. With each cache miss logical processor looks to its next level of cache until it has to fetch the information from RAM or mass storage.

In an embodiment CPU service provider 404 can be configured to select a physical processor that shares a level of cache with a physical processor set as the ideal physical processor for a virtual processor within the virtual machine. In a specific example embodiment, CPU service provider 404 can be configured to select a physical processor that shares the highest level of cache. As shown by FIG. 6, suppose that both physical processor 451 or 453 have excess capacity to run a virtual processor and physical processor 450 is set as the ideal physical processor for a virtual processor running within a virtual machine. In this example, CPU service provider 404 can be configured to determine that L2 cache is the highest level of shared cache within NUMA node 502 and that physical processor 451 shares this level of cache with physical processor 450 (in an embodiment this information can be generated by virtualization system 420 upon boot by querying each physical processor to obtain cache topology information and storing the information in a data structure). In this example, CPU service provider 404 can select physical processor 450 as the ideal physical processor for virtual processors 463 since it shares the highest level of cache with physical processor 450.

In an embodiment where cache topology and NUMA topology are used to select a physical processor, CPU service provider 404 select a physical processor by narrowing the search to a specific NUMA node and then select a physical processor that shares cache within the NUMA node. As such, CPU service provider 404 can generate a list of physical processors that have excess capacity; determine that NUMA node 502 is the target node based on information that indicates that physical processor 450 is set as the ideal physical processor for a virtual processor within virtual machine 410; and select physical processor 451 based on information that indicates that it shares the highest level of cache with physical processor 450.

Turning back to FIG. 4, in addition to adding virtual processors to resource-starved virtual machines, CPU service provider 404 can be configured to remove virtual processors from virtual machines when CPU pressure is low. This in turn may reduce the amount of power computer system 400 consumes. In an exemplary embodiment, virtual processors can be removed when the physical processor utilization data that can be attributed to running virtual processors within a virtual machine falls below a threshold, e.g., 20%, 30%, 40%, etc. In response to such a determination, CPU service provider 404 can remove a virtual processor by sending a signal that includes the virtual processor identifier for the virtual processor that is being removed to the CPU service consumer running within the virtual machine. The CPU service consumer can send a signal to the virtual processor, which can send a signal to the guest operating system scheduler indicating that it is removing itself from the idle loop of the scheduler. After the virtual processor exits from the loop, CPU service consumer can send a signal to CPU service provider 404 indicating the same and CPU service provider 404 can remove the virtual processor from the virtual machine.

Since some guest operating systems allow threads to affinitize to virtual processors, removal of a virtual processor that is affinity bound to a thread could cause the application or even the guest operating system to crash. In order to overcome this problem, the guest operating system can be modified to recognize a new class of virtual processor herein referred to as removable-virtual processors. In this exemplary embodiment, when a virtual machine is created it can be provided with one or more regular virtual processors herein referred to a "committed-virtual processors," and one or more removable-virtual processors. The difference between the two types of virtual processors is that committed-virtual processors will not be removed from a virtual machine and removable-virtual processors may be removed, depending on conditions within computer system 400. As such, threads can affinity bound to committed-virtual processors but not removable-virtual processors.

Guest operating system can be modified to process information that indicates whether a virtual processor is committed or removable and use the information when it is affinity binding to virtual processors. For example, when a virtual processor is added information can be sent by CPU service provider 404 to CPU a service consumer that includes the virtual processor identifier and if it is committed or removable. The CPU service consumer can then send the identifier for the virtual processor as well whether it is removable or committed to the kernel of the guest operating system. The guest operating system can be configured to detect the presence of committed-virtual processors and removable-virtual processors and affinity bind to only the committed-virtual processors.

Applications may also be modified to only affinity bind to committed-virtual processors. As such, when an application calls an affinity binding API of the guest operating system, the guest operating system can return information that indicates that some of the virtual processors are committed and others are removable. The application can process the information and affinity bind to committed virtual processors instead of removable-virtual processors.

Figure 7:
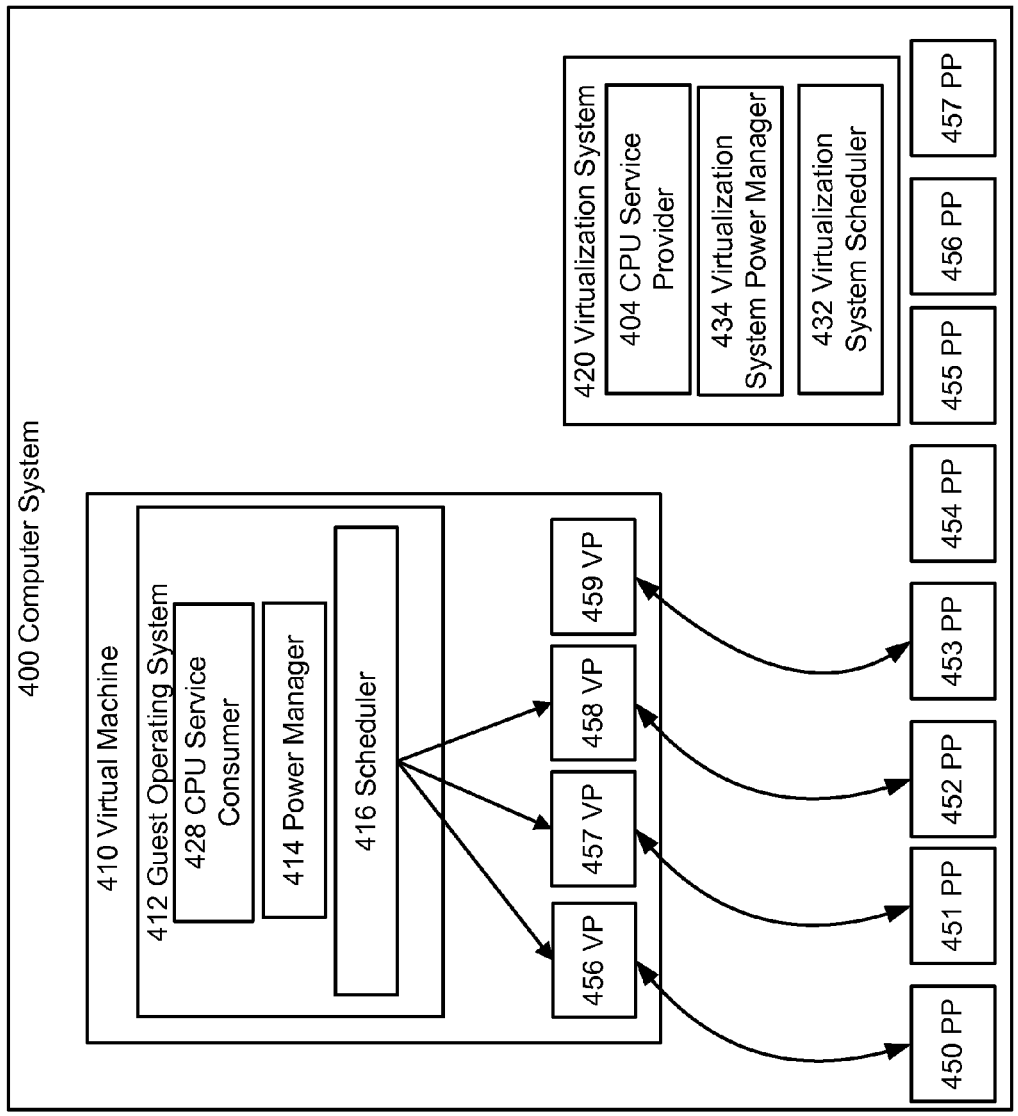
FIG. 7 depicts a high-level block diagram of a computer system configured to park/unpark physical processors and a virtual machine configured to park/unpark virtual processors.

Turning now to FIG. 7, it illustrates a technique for parking and unparking virtual processors and corresponding physical processors (virtual machine 418 has been removed from this figure for the sake of clarity). Referring to power manager 414, it can operate in conjunction with CPU service consumer 428 and CPU service provider 404 to cause virtual processors to enter a low power C-state. Simultaneously, virtualization system power manager 434 can monitor physical processor utilization data and determine whether any physical processors can be set to a low power C-state. In the illustrated example, the straight arrows connecting scheduler 416 to virtual processors 456-458 indicate that scheduler 416 has de-prioritized scheduling on virtual processor 459, i.e., VP 459 has been parked.

Turning to power manager 414, in an embodiment it can be modified to use physical processor utilization data that is attributable to the virtual processors within the virtual machine to determine whether or not to park or unpark a virtual processor. For example, CPU service provider 404 can determine and send physical processor utilization data to CPU service consumer 428, which can send the physical processor utilization data to power manager 414. Power manager 414 can execute and combine physical processor utilization data attributable to two or more virtual processors to and compare it to a threshold, e.g., 30%, 35%, 40%. In a specific example, suppose the power manger 414 receives physical processor utilization information for virtual processors 456-459. Power manager 414 in this example can combine the physical processor utilization data attributable to VP 456 with VP 459 and compare it to a threshold. Suppose in this specific example that the combination is below a threshold, e.g., the combination is under 30%. Power manager 414 can then combine the physical processor utilization data attributable to VP 456 with VP 458 and compare it to a threshold and so on and so forth until all the different combinations are checked.

In the instance that the combined utilization for multiple virtual processors is under the threshold, power manager 414 can set a bit in a bitmap that represents the virtual processor, e.g., virtual processor 459. When scheduler 414 receives a request to schedule a thread, scheduler 416 can check the bitmap and determine virtual processor 459 has been de-prioritized and schedule the thread on a different virtual processor, e.g., on virtual processor 456, 457, or 458. As such, virtual processor 459 is still allocated to virtual machine 410 and best-efforts are used to avoid scheduling virtual processor 459. Consequently, if no other virtual processors are idle when a request to run a thread is received and/or the thread is affinitized to virtual processor 459, scheduler 416 can schedule the thread on virtual processor 459.

Similar to power manager 414, virtualization system power manager 432 can also be monitoring physical processor utilization data. In the instance that the utilization data for two or more physical processors can be combined and the combined utilization is below a threshold, virtualization system power manager 432 can park a physical processor. In the instance that virtual processor 459 is parked, the utilization data for its corresponding physical processor, i.e., physical processor 453 will go down. This may cause virtualization system power manager 432 to park physical processor 453 thereby reducing the power consumed by computer system 400.

Figure 8:
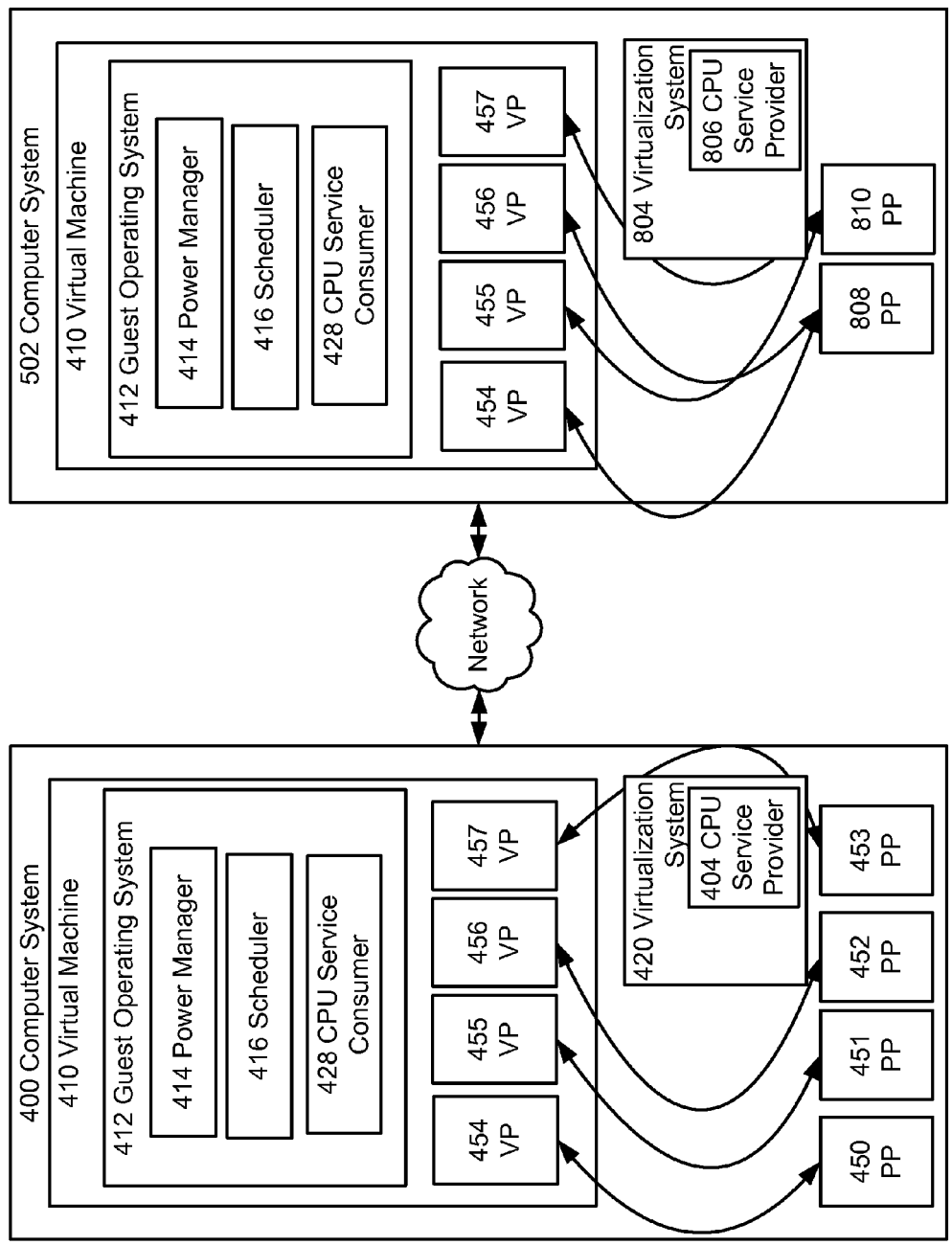
FIG. 8 depicts a high-level block diagram of a computer system configured to migrate a virtual machine to a computer system including a number of physical processors that is less than a number of virtual processors running within the virtual machine.

Turning now to FIG. 8, it illustrates an operational environment, e.g., a datacenter, including computers system 400 and 802. Computer system 802 can be similar to computer system 400 of FIG. 4 and can be connected to computer system 400 via a network such as the Internet or an internal network. In this example, parking techniques can be used to migrate a virtual machine from a host to a target computer system that has less physical processors. In this example, however, the virtual processors are not being parked based on utilization information; rather, they are being parked based on the number of physical processors that are available on the target.

As shown in the figure, a virtual machine such as virtual machine 410 may be migrated from one host, e.g., computer system 400, to a target, e.g., computer system 802; however, the in the instance that the number of physical processors on the target is less than on the host CPU service provider 404 can cause virtual machine 410 to park one or more of its virtual processors. By forcing processors to park, the guest will avoid running all four virtual processors at the same time and the performance hit due to running concurrent workloads on virtual processors assigned to the same physical processor will be mitigated.

During a migration operation, virtualization system 804 can send information that indicates the number of physical processors it has to virtualization system 420, i.e., two. This information can be routed to CPU service provider 404, which can be configured to determine how many (if any) virtual processors need to be parked from the information. CPU service provider 404 can subtract the number of physical processors within target computer system 802 from the number of virtual processors running within virtual machine 410 to obtain a parking-number (which is two in this example) and park this number of virtual processors. In an exemplary embodiment, CPU service provider 404 can park the last virtual processor in the virtual machine 410, a removable-virtual processor that is removable, a virtual processor that is not affinity bound to any threads, etc. In a specific example, suppose that CPU service provider 404 determines to park virtual processors 456 and virtual processors 457. In this example, CPU service provider 404 can send a signal to CPU service consumer 428 directing it to park virtual processors 456 and 457. CPU service consumer 428 can receive the signal and route it to power manager 414, which can set bits in a bitmap that indicate to scheduler 416 that these virtual processors have been forcibly parked.

Virtual machine 410 can then be migrated to computer system 802 and virtualization system 804 (which can be a different instance of virtualization system 420) can instantiate it. In this example, CPU service provider 806 can receive information from virtualization system 420 that indicates that virtual processors 456 and 457 were forcibly parked and use this information to set the ideal virtual processors to physical processors 808 and 810. CPU service provider 806 can be configured to set ideal processors such that the chance unparked virtual processors are set to the same ideal physical processor is minimized. For example, CPU service provider 806 can first link unparked virtual processors to physical processors and then link parked virtual processors to physical processors. In this regard, virtual processors 456 and 457 can still be scheduled, but performance of virtual machine 410 will suffer.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 9:
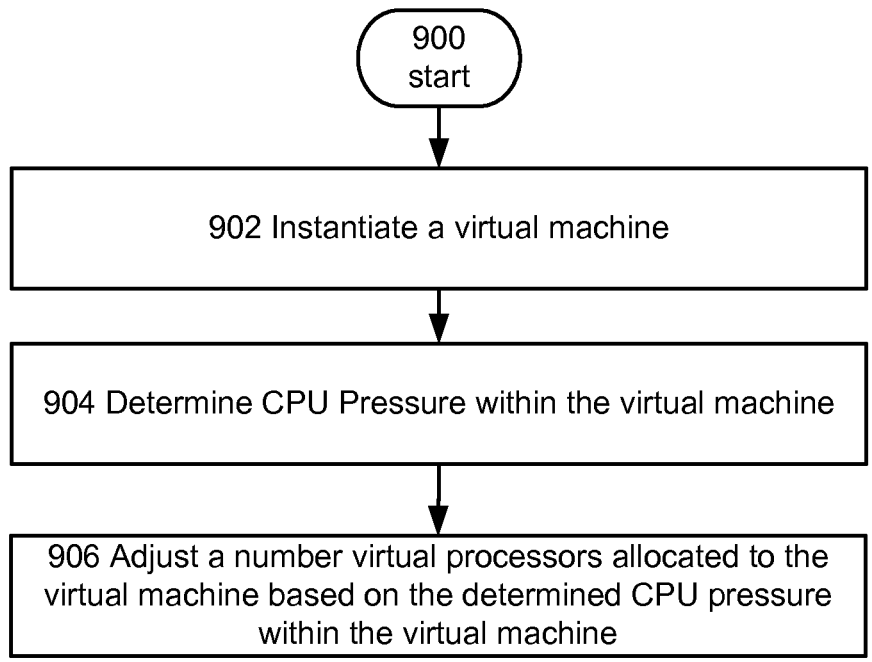
FIG. 9 illustrates an operational procedure.

Turning now to FIG. 9, it shows an operational procedure. Operation 900 begins the operational procedure and operation 902 shows that a virtual machine can be instantiated. For example, and turning to FIG. 4, computer system 400 can include circuitry configured to instantiate a virtual machine, the virtual machine including at least a first virtual processor. In a specific example, computer system 400 can include executable instructions indicative of virtualization system 420, e.g., hypervisor microkernel 202 and host environment 204. In this example, virtualization system 420 can instantiate, e.g., start-up, a virtual machine such as virtual machine 410 and allocate a virtual processor, e.g., virtual processor 460, to it.

Continuing with the description of FIG. 9, at operation 904 CPU pressure within the virtual machine can be determined. For example, computer system 400 can include circuitry configured to determine that a proportion of physical processor utilization data attributable to running the first virtual processor allocated to the virtual machine is greater than a first threshold. In this example, CPU service provider 404 can track physical processor utilization data for physical processors within computer system 400, e.g., utilization data for physical processors 450-457, and determine what proportion of the physical processor utilization data can be attributed to running the different virtual processors of virtual machine 410. For example, suppose that during a second of time physical processor 450 runs virtual processor 460 for 60% of the cycles, virtual processor 464 for 40% of the available cycles. In this example, CPU service provider 404 can determine that 60% of the cycles can be attributed to running virtual processors of virtual machine 410 from the information stored in the aforementioned data structure. In a specific example, computer system 400 can include circuitry configured to determine the proportion of the physical processor utilization data attributable to running non-affinitized threads of the virtual machine is greater than the first threshold. For example, CPU service consumer 428 can be configured to determine, from physical processor utilization data obtained from virtualization system scheduler 432 and virtual processor utilization data obtained from a scheduler running within a guest operating system, the proportion of the physical processor utilization data that can be attributed to running non-affinitized threads.

Referring to operation 906 of FIG. 9, depending on the detected CPU pressure within virtual machine 410, CPU service provider 404 may add a virtual processor, remove a virtual processor, or do nothing. Suppose that the detected CPU pressure is above a threshold, e.g., the proportion of processor cycles spent running virtual processors for virtual machine 410 is greater than 70% of the capacity of the physical processors that ran the virtual processors. In this example, computer system 400 can include circuitry configured to while the virtual machine is instantiated, add a second virtual processor to the virtual machine in response to the determination that the proportion of physical processor utilization data attributable to running the first virtual processor allocated to the virtual machine is greater than the first threshold. Turning to FIG. 4, in a specific example, the circuitry can be effectuated by CPU service provider 404 running on a physical processor such as physical processor 450. In a specific example, the circuitry configured to add a virtual processor can include circuitry configured to add the second virtual processor to the virtual machine in response to a determination that a combination of utilization data for a physical processor and estimated utilization data caused by running the second virtual processor is less than a second threshold. In this example, computer system 400 may add a virtual processor to virtual machine 410 if there is a physical processor that can accommodate a number of processor cycles that the virtual processor is estimated to use. Additionally or alternatively, computer system 400 may use NUMA topology or cache topology to determine whether to add a virtual processor to virtual machine 410.

In addition to adding virtual processors, in an exemplary embodiment, the determined CPU pressure may be lower than a threshold and virtual processors may be removed. For example, in this embodiment, computer system 400 can include circuitry configured to remove the removable-virtual processor in response to a determination that a proportion of the physical processor utilization data attributable to running non-affinitized threads within the virtual machine is less than a second threshold. In a specific configuration, and referring to FIG. 4, computer system 400 can include executable instructions that effect CPU service provide 404. In this example, the executable instructions can be run by a processor such as physical processor 450 and a removable-virtual processor, e.g., virtual processor 459 in a specific example, can be removed from virtual machine 410. For example, CPU service consumer 428 can instruct virtual processor 459 to exit from the idle loop of scheduler 416. Virtualization system 420 can then delete data structures associated with virtual processor 459 from random access memory.

Figure 10:
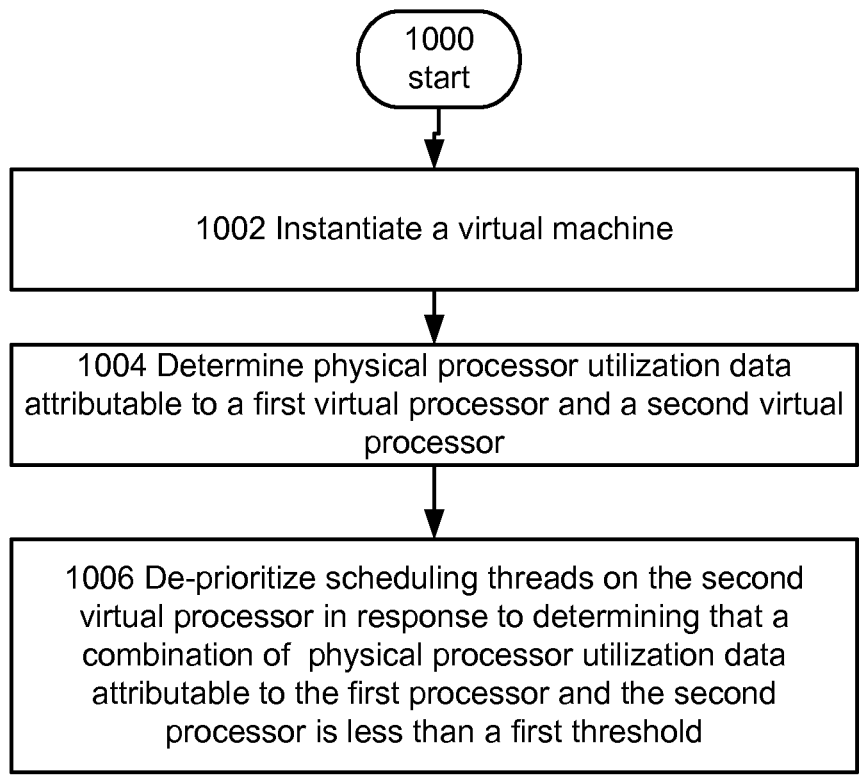
FIG. 10 illustrates an operational procedure.

Turning now to FIG. 10, operation 1000 begins the operational procedure and operation 1002 shows that a virtual machine can be instantiated. In a specific example, computer system 400 can include executable instructions indicative of virtualization system 420, e.g., hypervisor 302. In this example, virtualization system 420 can instantiate, e.g., start-up, a virtual machine such as virtual machine 410 and allocate a virtual processor, e.g., virtual processor 460, to it. Once virtual machine 410 is running, and referring to operation 1004, CPU pressure within virtual machine 410 can be computed.

In this example, suppose the CPU pressure is such that the proportion of cycles used to run a first and a second virtual processor indicates that one of the virtual processors can be parked. In this example, and turning to operation 1006, computer system 400 can include circuitry configured to de-prioritize scheduling threads on the second virtual processor in response to a determination that a combination of a proportion of physical processor utilization data attributable to running the first virtual processor and a proportion of physical processor utilization data attributable to running the second virtual processor is less than a third second threshold. After the virtual processor parked, CPU pressure can continue to be monitored to determine whether additional virtual processors should be parked, the virtual processors should be unparked, and/or to determine whether to add/remove virtual processors.

Figure 11:
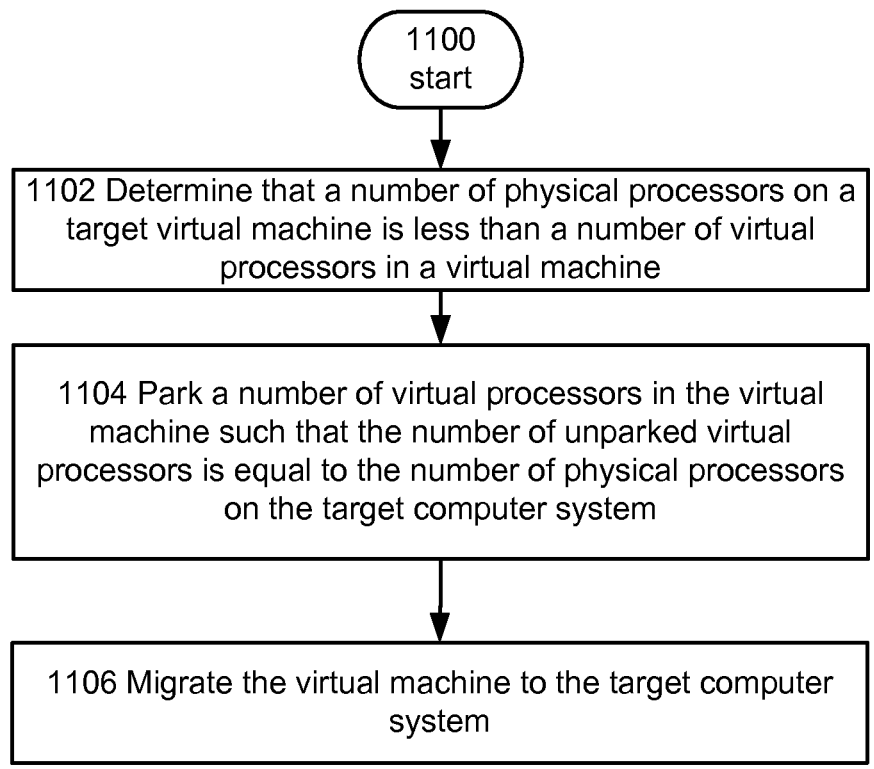
FIG. 11 illustrates an operational procedure.

Turning now to FIG. 11, it illustrates an operational procedure for migrating a virtual machine, such as virtual machine 410. At operation 1100, and turning to FIG. 8, suppose that virtual machine 410 is running and a determination is made to migrate virtual machine 410 to computer system 502. For example, suppose that an administrator wants to move virtual machine 410 or a load balancing computer system determines that the efficiency of a datacenter including computer system 400 and 802 would be increased if virtual machine 410 was moved. At operation 1102, virtualization system 420 can determine that the number of physical processors on computer system 802 is less than the number of virtual processors running within virtual machine 410. In response to this determination, CPU service provider 404 can determine to park a number of virtual processors within virtual machine 410 such that the number of virtual processors within virtual machine 410 is equal to the number of physical processors running within computer system 802. In the illustrated example, CPU service provider 404 would determine to park two virtual processors. As shown by operation 1106, after the virtual processors are parked, virtual machine 410 can be migrated to computer system 802.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A computer-readable hardware device bearing instructions that upon execution by a processor of a computer system cause the processor to:
    instantiate a virtual machine, the virtual machine including at least a first and a second virtual processor;
    determine that a proportion of physical processor utilization data attributable to running the first and second virtual processor allocated to the virtual machine is greater than a first threshold;
    while the virtual machine is instantiated, add a third virtual processor to the virtual machine in response to the determination that the proportion of physical processor utilization data attributable to running the first and second virtual processor allocated to the virtual machine is greater than the first threshold;
    de-prioritize scheduling threads on the third virtual processor in response to a determination that a target computer system includes a number of physical processors that is less than a number of virtual processors allocated to the virtual machine; and
    migrate the virtual machine to the target computer.

2. The computer-readable hardware device of claim 1, wherein the instructions that upon execution cause the processor to determine that the proportion of physical processor utilization data attributable to running the first virtual processor allocated to the virtual machine is greater than the first threshold further comprise instructions that upon execution cause the processor to:
    determine the proportion of the physical processor utilization data attributable to running non-affinitized threads of the virtual machine is greater than the first threshold.

3. The computer-readable hardware device of claim 1, wherein the instructions that upon execution cause the processor to add a third virtual processor to the virtual machine further comprise instructions that upon execution cause the processor to:
    add the third virtual processor to the virtual machine in response to a determination that a combination of utilization data for a physical processor and estimated utilization data caused by running the third virtual processor is less than a second threshold.

4. The computer-readable hardware device of claim 1, wherein the instructions that upon execution cause the processor to add a third virtual processor to the virtual machine further comprise instructions that upon execution cause the processor to:
    identify a first physical processor as an ideal physical processor for the first virtual processor; and
    set another physical processor that shares a cache with the first physical processor as an ideal physical processor for the third virtual processor.

5. The computer-readable hardware device of claim 1, wherein the instructions that upon execution cause the processor to add a third virtual processor to the virtual machine further comprises instructions that upon execution cause the processor to:
    identify a first physical processor set as an ideal physical processor for the first virtual processor, the first physical processor within a first non-uniform memory access ("NUMA") node; and
    set another physical processor within the first NUMA node as an ideal physical processor for the third virtual processor.

6. The computer-readable hardware device of claim 1, further comprising instructions that upon execution cause the processor to:
    de-prioritize scheduling threads on the second virtual processor in response to a determination that a combination of a proportion of physical processor utilization data attributable to running the first virtual processor and a proportion of physical processor utilization data attributable to running the third virtual processor is less than a second threshold.

7. The computer-readable hardware device of claim 1, further comprising instructions that upon execution cause the processor to:
    set the third virtual processor as a removable-virtual processor; and
    remove the removable-virtual processor in response to a determination that a proportion of the physical processor utilization data attributable to running non-affinitized threads within the virtual machine is less than a second threshold.

8. The computer-readable hardware device of claim 1, further comprising instructions that upon execution cause the processor to:
    set the first virtual processor as a removable-virtual processor;
    report virtual processor topology information to a program, the virtual processor topology information indicating that the removable-virtual processor is removable; and
    remove the removable-virtual processor in response to a determination that a proportion of the physical processor utilization data attributable to running non-affinitized threads within the virtual machine is less than a second threshold.

9. A computer system, comprising:
    a first physical processor;
    a second physical processor; and
    a memory in communication with the first physical processor and the second physical processor when powered, the memory having executable instructions stored thereon that upon execution cause the computer system to:

instantiate a virtual machine including a first virtual processor, the first virtual processor associated with the first physical processor;

determine a proportion of physical processor cycles used to run the first virtual processor is greater than a first threshold;

add a second virtual processor to the virtual machine, the second virtual processor associated with the second physical processor;

de-prioritize scheduling threads on the second virtual processor in response to a determination that a target computer system includes a number of physical processors that is less than a number of virtual processors allocated to the virtual machine; and migrate the virtual machine to the target computer.

10. The computer system of claim 9, wherein the memory further comprises instructions that upon execution cause the computer system to determine a proportion of physical processor cycles used to run non-affinitized threads of the virtual machine.

11. The computer system of claim 9, wherein the instructions that upon execution cause the computer system to add the second virtual processor to the virtual machine further comprise instructions that upon execution cause the computer system to:

add the second virtual processor to the virtual machine in response to a determination that a combination of an amount of processor cycles used by the second physical processor and an estimated amount of processor cycles used to run the second virtual processor is less than a second threshold.

12. The computer system of claim 9, wherein the instructions that upon execution cause the computer system to add the second virtual processor to the virtual machine further comprise instructions that upon execution cause the computer system to:

select the second physical processor from a group of physical processors in response to a determination that the second physical processor shares a cache with the first physical processor.

13. The computer system of claim 9, wherein the memory further comprises instructions that upon execution cause the computer system to:

de-prioritize scheduling threads on the first virtual processor in response to a determination that a combination of an amount of physical processor cycles attributable to running the first virtual processor and an amount of physical processor cycles attributable to running the second virtual processor is less than a second threshold.

14. A computer implemented method, comprising:

instantiating a virtual machine, the virtual machine including a group of virtual processors, the group including a committed-virtual processor;

determining that a proportion of physical processor utilization data attributable to running the group of virtual processors of the virtual machine is greater than a first threshold;

while the virtual machine is instantiated, adding, by a computer system, a removable-virtual processor to the virtual machine in response to the determination that the proportion of physical processor utilization data attributable to running the group of virtual processors of the virtual machine is greater than the first threshold;

de-prioritizing scheduling threads on the removable-virtual processor in response to a determination that a target computer system includes a number of physical processors that is less than a number of virtual processors in the group of virtual processors allocated to the virtual machine; and migrating the virtual machine to the target computer.

15. The computer implemented method of claim 14, further comprising:

removing the removable-virtual processor in response to a determination that the proportion of physical processor cycles that are attributable to running non-affinitized threads on the group of virtual processors is less than a second threshold.

16. The computer implemented method of claim 14, wherein adding the removable-virtual processor further comprises:

determining that a first physical processor is associated with the committed-virtual processor; and associating the removable-virtual processor with a second physical processor, the second physical processor sharing a cache with the first physical processor.

17. The computer implemented method of claim 14, wherein adding the removable-virtual processor further comprises:

associating a physical processor with the removable-virtual processor in response to a determination that a combination of utilization data for the physical processor and utilization data estimated for the removable-virtual processor is less than a second threshold.

\* \* \* \* \*